US012744217B2

(12) United States Patent
Oh et al.

(10) Patent No.: US 12,744,217 B2
(45) Date of Patent: Sep. 22, 2026

(54) ELECTRODE FOR LITHIUM SECONDARY BATTERY INCLUDING FIBRILLATED BINDER AND MANUFACTURING METHOD THEREOF

(71) Applicants: HYUNDAI MOTOR COMPANY, Seoul (KR); KIA CORPORATION, Seoul (KR)

(72) Inventors: Dae Yang Oh, Hwaseong-si (KR); Byung Yong Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 771 days.

(21) Appl. No.: 17/994,624

(22) Filed: Nov. 28, 2022

(65) Prior Publication Data

US 2023/0178745 A1 Jun. 8, 2023

(30) Foreign Application Priority Data

Dec. 7, 2021 (KR) ........................ 10-2021-0173367

(51) Int. Cl.

| | |
|---|---|
| ***H01M 4/62*** | (2006.01) |
| ***H01M 4/04*** | (2006.01) |
| ***H01M 10/052*** | (2010.01) |
| ***H01M 10/0562*** | (2010.01) |
| *H01M 4/02* | (2006.01) |

(52) U.S. Cl.

CPC .......... *H01M 4/623* (2013.01); *H01M 4/043* (2013.01); *H01M 10/052* (2013.01); *H01M 10/0562* (2013.01); *H01M 2004/021* (2013.01); *H01M 2300/0068* (2013.01)

(58) Field of Classification Search

CPC .......... H01M 4/62; H01M 4/623; H01M 4/04; H01M 4/043; H01M 10/052; H01M 10/0562; H01M 2004/021; H01M 2300/0068

USPC .......................................................... 429/304

See application file for complete search history.

(56) References Cited

U.S. PATENT DOCUMENTS

| | | | |
|---|---|---|---|
| 5,393,617 | A | 2/1995 | Klein |
| 2015/0303481 | A1 | 10/2015 | Duong et al. |
| 2020/0044284 | A1 | 2/2020 | Fujino et al. |

FOREIGN PATENT DOCUMENTS

| | | | | | |
|---|---|---|---|---|---|
| CN | 1149767 | A | | 5/1997 | |
| CN | 104347884 | B | | 11/2016 | |
| CN | 105990554 | B | | 2/2019 | |
| JP | 2004-111131 | A | | 4/2004 | |
| JP | 2016-145361 | A | | 8/2016 | |
| JP | 2017517862 | A | * | 6/2017 | ........... H01G 9/0425 |
| JP | 2020021674 | A | * | 2/2020 | ............ H01M 4/386 |
| KR | 10-0349755 | B1 | | 1/2003 | |
| KR | 10-1879622 | B1 | | 7/2018 | |
| KR | 20180119158 | A | * | 11/2018 | ............. H01G 11/42 |
| KR | 10-2019-0041733 | A | | 4/2019 | |
| KR | 10-2020-0020220 | A | | 2/2020 | |

OTHER PUBLICATIONS

Machine translation of JP 2017517862 A (Year: 2017).*
Machine translation of KR 20180119158 A (Year: 2018).*
Machine translation of JP 2020021674 A (Year: 2020).*

* cited by examiner

*Primary Examiner* — Kevin P Kerns

(74) *Attorney, Agent, or Firm* — Morgan Lewis & Bockius LLP

(57) ABSTRACT

Proposed is an electrode for a lithium secondary battery including a fibrillated binder and a manufacturing method thereof.

4 Claims, 3 Drawing Sheets

ELECTRODE FOR LITHIUM SECONDARY BATTERY INCLUDING FIBRILLATED BINDER AND MANUFACTURING METHOD THEREOF

CROSS REFERENCE TO RELATED APPLICATION

The present application claims priority to Korean Patent Application No. 10-2021-0173367, filed Dec. 7, 2021, the entire contents of which is incorporated herein for all purposes by this reference.

BACKGROUND OF THE PRESENT DISCLOSURE

Field of the Present Disclosure

The present disclosure relates to an electrode for a lithium secondary battery including a fibrillated binder and a manufacturing method thereof.

Description of Related Art

Electrodes for a lithium secondary battery, such as a lithium ion battery and an all-solid-state battery, are manufactured by coating and drying a wet slurry containing an active material on a current collector.

Recently, an electrode has been thickened to increase the energy density of a battery, and it is difficult to thicken an electrode through the wet process. As the electrode becomes thicker, it is difficult to dry, and the binder dissolved in the solvent is excessively deposited from the upper part of the electrode, thereby causing a lifting phenomenon of the binder.

Meanwhile, in an all-solid-state battery, contact between solid particles is important for a smooth electrochemical reaction. However, since the binder covers the surface of solid particles such as an active material and a solid electrolyte in the electrode manufactured by the wet process, a lot of electrical short circuits occur, and performance degradation is severe.

Furthermore, in the wet process, a solvent with a polar functional group must be used to obtain the process environment, process capability, the adhesive force of a binder, and solubility. However, the sulfide-based solid electrolyte used in all-solid-state batteries is chemically vulnerable to solvents with the above polar functional groups.

The information disclosed in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an electrode for a lithium secondary battery that does not use a solvent and a method for manufacturing the same.

Another objective of the present disclosure is to provide an electrode for a lithium secondary battery capable of minimizing blocking of a path through which electrons conduct using a fibrillated binder and a method for manufacturing the same.

The objective of the present disclosure is not limited to the object mentioned above. The objectives of the present disclosure will become more apparent from the following description and will be realized by means and combinations thereof described in the claims.

An electrode for a lithium secondary battery, according to an exemplary embodiment of the present disclosure, includes an active material and a fibrillated binder, in which the fibrillated binder may have a specific gravity measured according to ASTM D4985 of about 2.185 or less.

The electrode may further include a sulfide-based solid electrolyte.

The fibrillated binder may have a diameter of about 0.01 μm to 10 μm.

The electrode may include the fibrillated binder in an amount of about 0.1% to 5% by weight.

The fibrillated binder may include polytetrafluoroethylene (PTFE).

A method of manufacturing an electrode for a lithium secondary battery, according to an exemplary embodiment of this disclosure, may include: preparing a mixture including an active material and a binder powder capable of fibrillation; applying shear stress to the mixture so that the mixture becomes clay; and forming the clay into a film.

The binder powder capable of fibrillation may have an average diameter (D50) of about 1 μm to 1,000 μm.

The binder powder may be fibrillated during applying shear stress to the mixture.

According to an exemplary embodiment of the present disclosure, it is possible to manufacture an electrode for a lithium secondary battery without using a solvent.

According to an exemplary embodiment of the present disclosure, since there is no drying process, the binder is not dissolved and precipitated, so an electrode for a lithium secondary battery without the lifting phenomenon of the binder can be obtained.

According to an exemplary embodiment of the present disclosure, an electrode for a lithium secondary battery of good quality which is thickened can be obtained.

According to an exemplary embodiment of the present disclosure, an electrode for a lithium secondary battery, including a fibrillated binder to minimize blocking of an electrical transfer path, may be obtained.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1A:
FIG. 1A shows an electrode of Example 1.
Figure 1A:
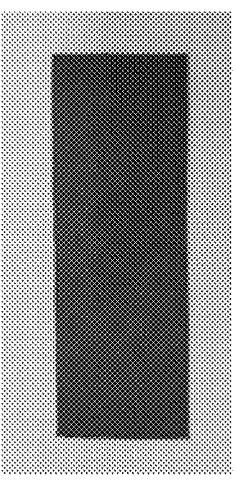

It may be understood that the appended drawings are not necessarily to scale, presenting a somewhat simplified representation of various features illustrative of the basic principles of the present disclosure. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present disclosure(s) will be described in conjunction with exemplary embodiments, it will be understood that the present description is not intended to limit the present disclosure(s) to those exemplary embodiments. On the contrary, the present disclosure(s) is/are intended to cover not only the exemplary embodiments, but also various alternatives, modifications, equivalents and other embodiments, which may be included within the spirit and scope of the present disclosure as defined by the appended claims.

The above objectives, other objectives, features, and advantages of the present disclosure will be easily understood through the following exemplary embodiments in conjunction with the accompanying drawings. However, the present disclosure is not limited to the embodiments described herein and may be embodied in other forms. Rather, the embodiments introduced herein are provided so that the disclosed content may be thorough and complete, and the spirit of the present disclosure may be sufficiently conveyed to those skilled in the art.

Like reference numerals have been used for like elements in describing each figure. In the accompanying drawings, the dimensions of the structures are enlarged than the actual size for clarity of the present disclosure. Terms such as first, second, etc., may be used to describe various elements, but the elements should not be limited by the terms. The above terms are used only for the purpose of distinguishing one component from another. For example, without departing from the scope of the present disclosure, a first component may be referred to as a second component, and similarly, a second component may also be referred to as a first component. The singular expression includes the plural expression unless the context clearly dictates otherwise.

In the present specification, the term "include" or "have" should be understood to designate that one or more of the described features, numbers, steps, operations, components, or a combination thereof exist, and the possibility of addition of one or more other features or numbers, operations, components, or combinations thereof should not be excluded in advance. Also, when a part of a layer, film, region, plate, etc., is said to be "on" another part, this includes not only the case where it is "on" another part but also the case where there is another part in between. Conversely, when a part of a layer, film, region, plate, etc. is said to be "under" another part, this includes not only cases where it is "directly under" another part but also a case where another part is in the middle.

Unless otherwise specified, all numbers, values, and/or expressions expressing quantities of ingredients, reaction conditions, polymer compositions, and formulations used herein contain all numbers, values and/or expressions in which such numbers essentially occur in obtaining such values, among others. Since they are approximations reflecting various uncertainties in the measurement, it should be understood as being modified by the term "about" in all cases. In addition, when a numerical range is disclosed in this disclosure, this range is continuous and includes all values from the minimum to the maximum value containing the maximum value of this range unless otherwise indicated. Furthermore, when such a range refers to an integer, all integers, including the minimum value to the maximum value containing the maximum value, are included unless otherwise indicated.

The electrode for a lithium secondary battery, according to an exemplary embodiment of the present disclosure, may include an active material and a fibrillated binder. When the lithium secondary battery, according to an exemplary embodiment of the present disclosure, is an all-solid-state battery, the electrode may further include a sulfide-based solid electrolyte. The electrode may be an anode or a cathode.

A method for manufacturing an electrode for a lithium secondary battery, according to an exemplary embodiment of this disclosure, may include: preparing a mixture including an active material and a binder powder capable of fibrillation; applying shear stress to the mixture so that the mixture becomes clay; and forming the clay into a film. When the lithium secondary battery, according to an exemplary embodiment of the present disclosure, is an all-solid-state battery, the mixture may further include a sulfide-based solid electrolyte.

The present disclosure is characterized in that the electrode is manufactured by a dry method without using a solvent. Therefore, the manufacturing method of the present disclosure is advantageous for thickening the electrode. In addition, since the binder does not undergo a process of being dissolved and precipitated in a solvent, problems such as an increase in resistance non-uniformity and a decrease in adhesive strength due to a lifting phenomenon of the binder do not occur. The term of "lifting phenomenon" means that when the solvent is volatilized, the binder moves together with the solvent in the volatilization direction of the solvent.

On the other hand, when the electrode includes the sulfide-based solid electrolyte, it is possible to prevent the sulfide-based solid electrolyte from being chemically deteriorated or damaged by contact with the solvent.

The electrode, according to an exemplary embodiment of the present disclosure, is characterized in that it includes a fibrillated binder. When an electrode is manufactured by a wet method, a binder dissolved in a solvent is precipitated, and since it covers the surface of solid particles such as an active material and a sulfide-based solid electrolyte, short circuits may occur within the electrode. On the other hand, in the present disclosure, since the fibrillated binder is used, it is possible to minimize the blocking of a path which electrons conduct in the electrode by the binder.

First, a mixture including the active material, a binder powder capable of fibrillation, and optionally a sulfide-based solid electrolyte may be prepared.

The active material may include a cathode active material or an anode active material.

The cathode active material is not particularly limited but may include, for example, an oxide active material, a sulfide active material, and the like.

The oxide active material may include a rock salt layer type active material such as $LiCoO_2$, $LiMnO_2$, $LiNiO_2$, $LiVO_2$, $Li_{1+x}N_{1/3}Co_{1/3}Mn_{1/3}O_2$, etc., a spinel type active material such as $LiMn_2O_4$, $Li(Ni_{0.5}Mn_{1.5})O_4$, a reverse spinel type active material such as $LiNiVO_4$ and $LiCoVO_4$, an olivine type active material such as $LiFePO_4$, $LiMnPO_4$, $LiCoPO_4$, $LiNiPO_4$, silicon-containing active material such as $Li_2FeSiO_4$, $Li_2MnSiO_4$, a rock salt layer type active material in which a part of the transition metal is substituted with a dissimilar metal such as $LiNi_{0.8}Co_{(0.2-x)}Al_xO_2$ (0<x<0.2), a spinel type active material in which a part of the transition metal is substituted with a dissimilar metal such as $Li_{1+x}Mn_{2-x-y}M_yO_4$ (M is at least one of Al, Mg, Co, Fe, Ni, Zn, and 0<x+y<2), and a lithium titanate such as $Li_4Ti_5O_{12}$, or the like.

The sulfide active material may include copper Chevrel, iron sulfide, cobalt sulfide, nickel sulfide, or the like.

The anode active material is not particularly limited but may include, for example, a carbon active material, a metal active material, and the like.

The carbon active material may include graphite such as meso-carbon microbeads (MCMB) and highly oriented graphite (HOPG), and amorphous carbon such as hard carbon, soft carbon, and the like.

The metal active material may include In, Al, Si, Sn, or an alloy containing at least one of these elements.

The sulfide-based solid electrolyte is not particularly limited but may include $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n are positive numbers, and Z is one of Ge, Zn, and Ga), $Li_2S$—$GeS_2$, $Li_2S$—$SiS_2$—$Li_3PO_4$, $Li_2S$—$SiS_2$-$Li_xMO_y$ (where x and y are positive numbers, M is one of P, Si, Ge, B, Al, Ga, In), $Li_{10}GeP_2S_{12}$, and the like.

The binder powder capable of fibrillation may include polytetrafluoroethylene (PTFE).

Polytetrafluoroethylene (PTFE) is a polymer in which all hydrogen elements of polyethylene (PE) are substituted with fluorine elements. Polytetrafluoroethylene (PTFE) is a polymer with an aliphatic main chain but has excellent thermal stability and electrical stability and thus is widely applied to the electronic material field. In particular, the polymer has a low highest occupied molecular orbital (HOMO) level and high oxidation stability, so it is mainly used for the cathode. Although the glass transition temperature (Tg) of the polytetrafluoroethylene (PTFE) is about 120° C., the temperature of the Beta transition is lower than room temperature, so when pressure is applied, it becomes fibrous or fibrillated.

The binder powder capable of fibrillation may have an average diameter (D50) of about 1 μm to 1,000 μm.

The mixture, including an active material, the binder powder capable of fibrillation, and optionally a sulfide-based solid electrolyte, may transform into clay by applying shear stress. In this process, the binder powder may be converted into a fibrillated binder.

A method of applying the shear stress is not particularly limited. Shear stress may be applied by an apparatus or method commonly used in the technical field to which the present disclosure pertains.

However, in order to manufacture an electrode using polytetrafluoroethylene (PTFE), which is a binder powder capable of being fibrillated, it is important to control the molecular weight thereof precisely. This is because the degree of fibrillation is determined according to the molecular weight of the polytetrafluoroethylene (PTFE).

Polytetrafluoroethylene (PTFE) is difficult to dissolve and melt due to its unique chemical and physical structure, thus defining its molecular weight in a different way from that of general polymers. The higher the molecular weight of the polytetrafluoroethylene (PTFE), the higher the crystallinity, and accordingly, the lower the specific gravity. Therefore, the present disclosure is characterized in that the electrode is manufactured using polytetrafluoroethylene (PTFE), having a standard specific gravity in a specific range. Here, “standard specific gravity” means a value measured according to ASTM D4895.

The fibrillated binder is characterized in that the specific gravity measured according to ASTM D4985 is about 2.185 or less. The lower limit of the specific gravity of the fibrillated binder may be, for example, about 2.160 or more. If the specific gravity of the fibrillated binder exceeds 2.185, the degree of fibrillation is low, and the mechanical properties such as tensile strength and an elongation may be deteriorated when the electrode is manufactured with a thick film.

The fibrillated binder may have a diameter of about 0.01 μm to 10 μm. The diameter means the diameter of the cross-section of the fibrillated binder. The cross-section means a cross-section in which the fibrillated binder is disconnected in a direction perpendicular to the longitudinal direction thereof. If the diameter of the fibrillated binder is less than 0.01 the mechanical properties of the electrode may not be sufficient, and if it exceeds 10 the transfer of electricity within the electrode may be hindered.

Thereafter, an electrode can be obtained by forming a film after the transformation into clay is completed.

The method of forming the film is not particularly limited. It can be fabricated by devices and methods commonly used in the technical field to which the present disclosure pertains.

The electrode may include the fibrillated binder in an amount of about 0.1% to 5% by weight. If the content of the fibrillated binder is less than 0.1% by weight, adhesive force, mechanical properties, and the like of the electrode may be decreased, and if the content of the fibrillated binder exceeds 5% by weight, the performance of the lithium secondary battery may be degraded because resistance in electrode is increased due to the fibrillated binder.

Hereinafter, another form of the present disclosure will be described in more detail through the following examples. The following examples are merely illustrative to help the understanding of the present disclosure, and the scope of the present disclosure is not limited thereto.

Examples 1 to 3

The active material, the solid electrolyte, and the binder powder capable of fibrillation are mixed without a solvent to obtain a mixture. Table 1 below summarizes the specific gravity of the binder powder capable of being fibrillated.

TABLE 1

| Division | Molecular weight [relative value] | Specific gravity* |
|---|---|---|
| Example 1 | High | 2.160 |
| Example 2 | Medium | 2.163 |
| Example 3 | Low | 2.185 |

Specific gravity is measured by manufacturing a specimen according to the international standard ASTM D4895

The mixture becomes clay by applying shear stress to the mixture. Transforming into clay is performed until the diameter of the fibrillated binder resulting from the binder powder capable of fibrillation becomes 0.01 μm to 10 μm.

An electrode is formed by calendering the resultant clay product.

Figure 1B:
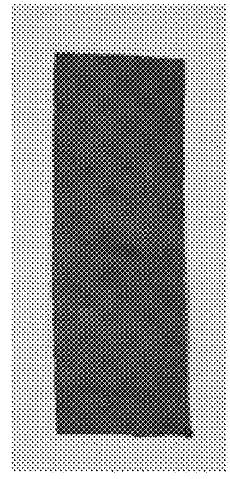
FIG. 1B shows an electrode of Example 2.
Figure 1C:
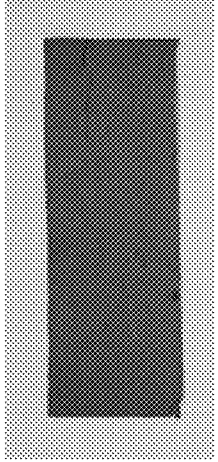
FIG. 1C shows an electrode of Example 3.

FIG. 1A shows an electrode of Example 1, FIG. 1B shows an electrode of Example 2, and FIG. 1C shows an electrode of Example 3.

Figure 2A:
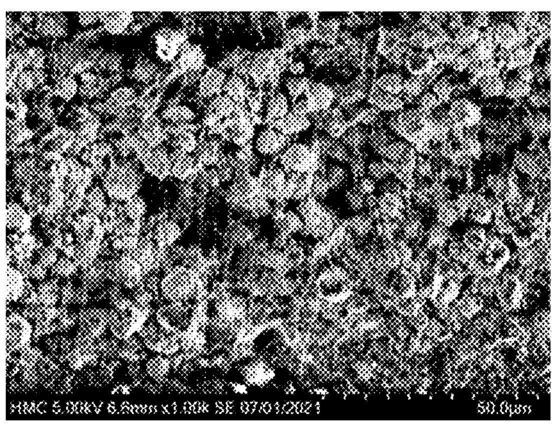
FIG. 2A shows a result of analyzing the electrode of Example 1 with a scanning electron microscope (SEM)
Figure 2B:
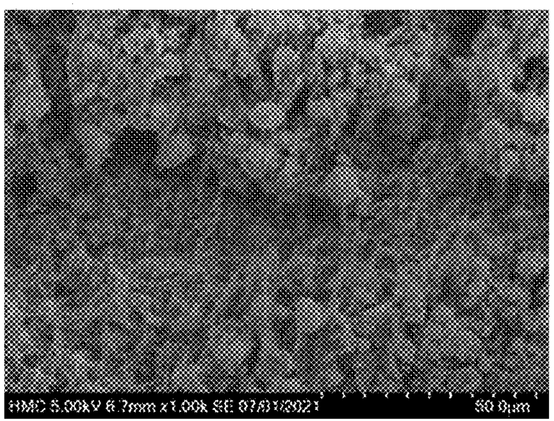
FIG. 2B shows a result of analyzing the electrode of Example 2 with a scanning electron microscope (SEM)
Figure 2C:
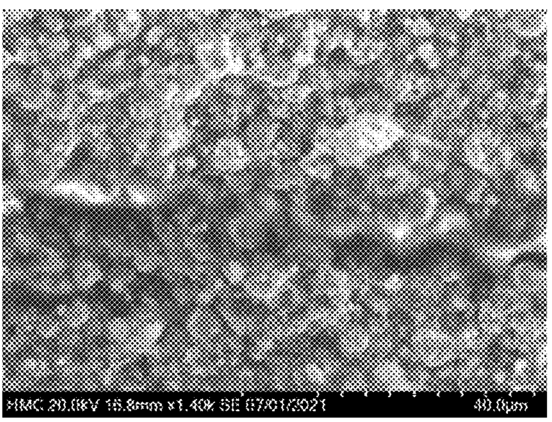
FIG. 2C shows a result of analyzing the electrode of Example 3 with a scanning electron microscope (SEM)

FIG. 2A shows a result of analyzing the electrode of Example 1 with a scanning electron microscope (SEM). FIG. 2B shows a result of analyzing the electrode of Example 2 with a scanning electron microscope (SEM). FIG. 2C shows a result of analyzing the electrode of Example 3 with a scanning electron microscope (SEM). Referring to these FIGS. 1A, 2A, 2B, and 2C, it can be seen that the fibrillated binder is well-formed in all of the electrodes according to FIG. 2A, FIG. 2B and FIG. 2C.

Figure 3:
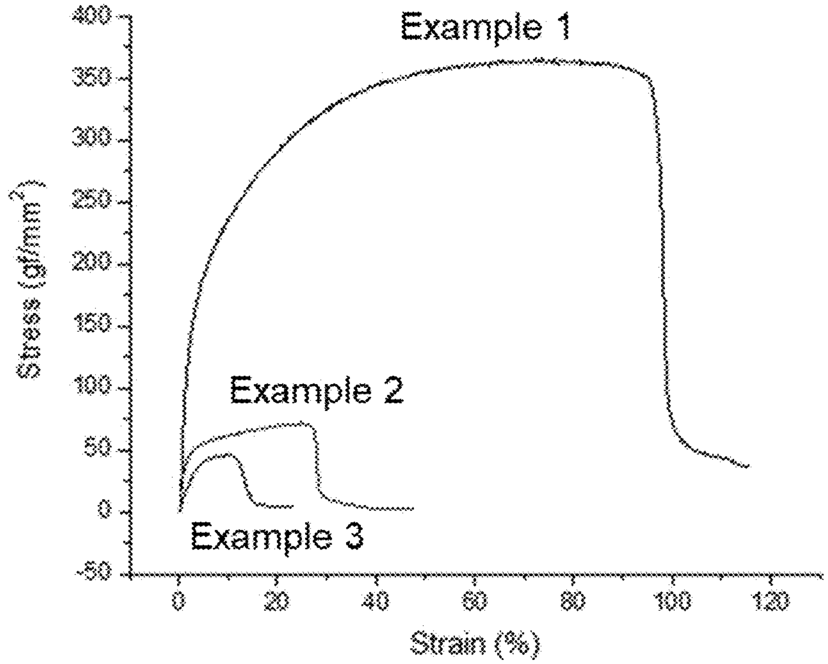
FIG. 3 shows a result of measuring the tensile strength and the elongation of the electrodes according to Examples 1 to 3.

The tensile strength and elongation of the electrodes according to Examples 1 to 3 were measured. The results are shown in FIG. 3 below. In addition, the maximum tensile strength and the elongation at the break of each electrode are summarized in Table 2 below.

TABLE 2

| Division | Molecular weight [relative value] | Maximum tensile strength [gf/mm$^2$] | Elongation at the break [%] |
|---|---|---|---|
| Example 1 | High | 365 | 95 |
| Example 2 | Medium | 72 | 27 |
| Example 3 | Low | 11 | 12 |

Referring to FIG. 3 and Table 2, as the molecular weight is increased, fiber is easily generated, thereby increasing tensile strength and elongation, which means that the fibrillated binder may easily hold an electrode material such as an active material, a solid electrolyte, and the like.

The foregoing descriptions of specific exemplary embodiments of the present invention have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the present disclosure and their practical application, to enable others skilled in the art to make and utilize various exemplary embodiments of the present invention, as well as various alternatives and modifications thereof. It is intended that the scope of the present disclosure be defined by the Claims appended hereto and their equivalents.

What is claimed is:

1. An electrode for a lithium secondary battery, the electrode comprising:

an active material;

a sulfide-based solid electrolyte, and a fibrillated binder, wherein a specific gravity of the fibrillated binder measured according to ASTM D4985 is about 2.160 to 2.163.

2. The electrode of claim 1, wherein a diameter of the fibrillated binder ranges from about 0.01 μm to 10 μm.

3. The electrode of claim 1, wherein the electrode comprises the fibrillated binder in an amount of about 0.1% to 5% by weight.

4. The electrode of claim 1, wherein the fibrillated binder comprises polytetrafluoroethylene (PTFE).

* * * * *